2 Sheets—Sheet 2.
O. HEIKEL.
Magneto Electric Machine.
No. 235,433. Patented Dec. 14, 1880.
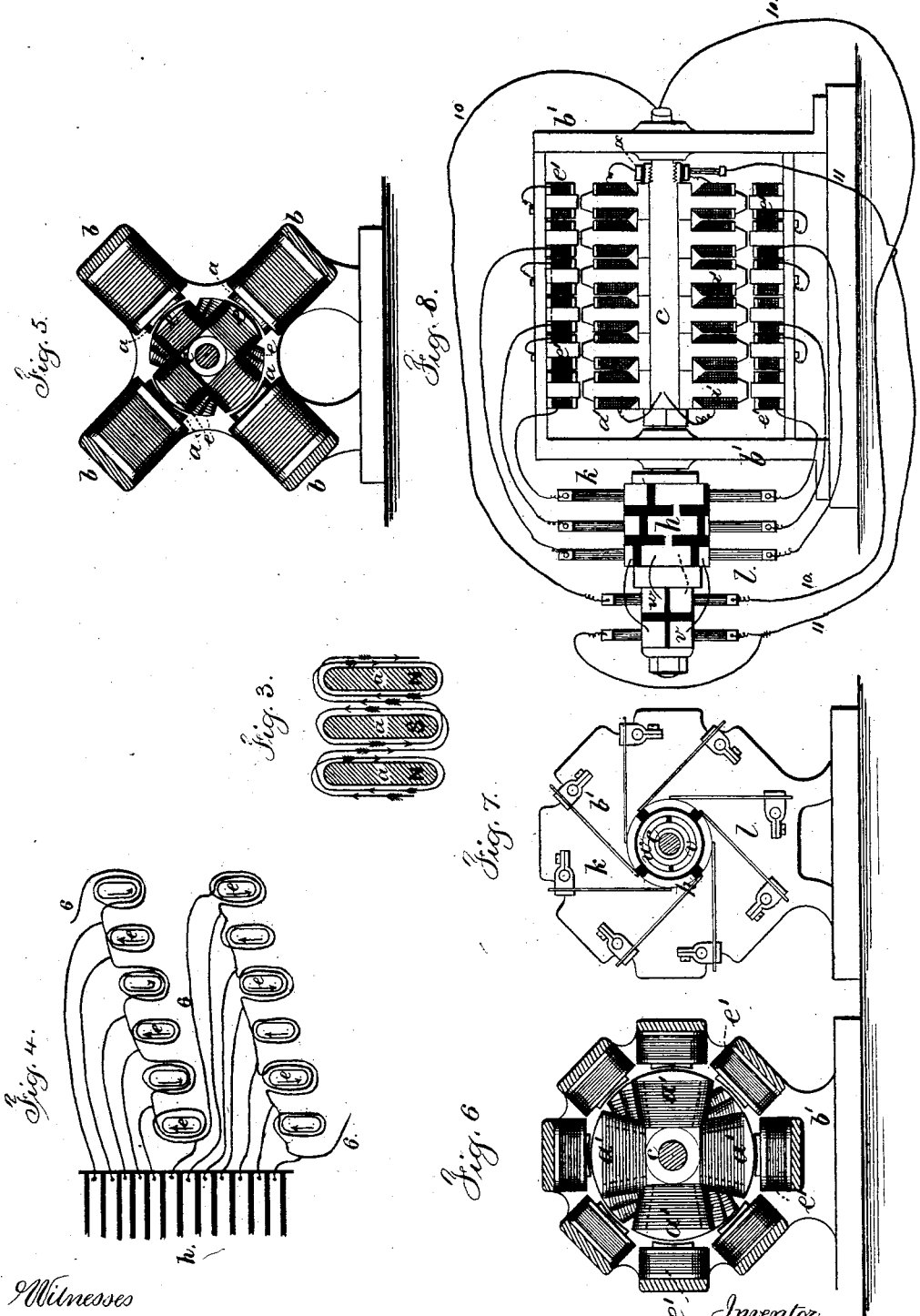
Witnesses
Chas. H. Smith
Geo. T. Pinckney
Inventor
Otto Heikel
per Lemuel W. Serrell
atty

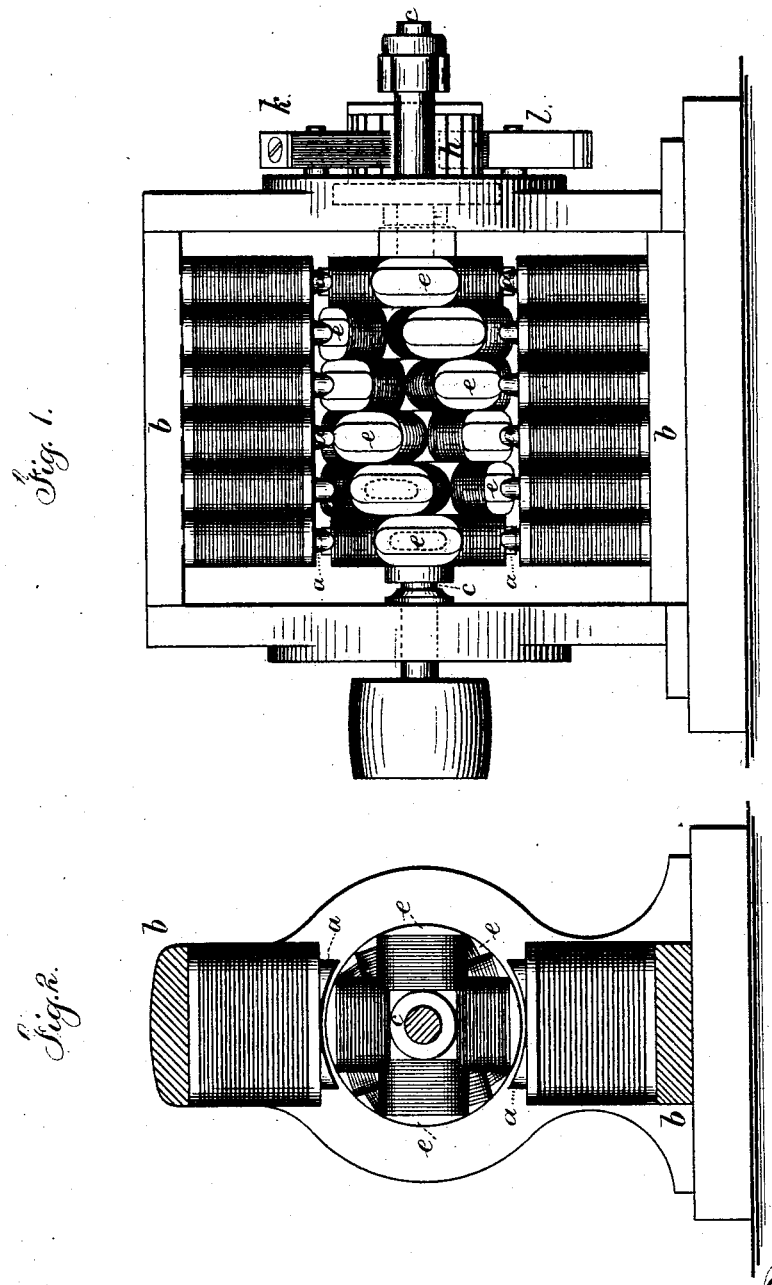

United States Patent Office.

OTTO HEIKEL, OF JERSEY CITY, NEW JERSEY, ASSIGNOR TO THE NATIONAL ELECTRIC LIGHT AND POWER COMPANY, OF NEW YORK, N. Y.

MAGNETO-ELECTRIC MACHINE.

SPECIFICATION forming part of Letters Patent No. 235,433, dated December 14, 1880.

Application filed May 12, 1879.

*To all whom it may concern:*

Be it known that I, OTTO HEIKEL, of Jersey City, in the State of New Jersey, have invented an Improvement in Magneto-Electric Machines, of which the following is a specification.

Magneto-electric machines have been made with the core of the field-of-force magnets broadest in the direction of the rotation of the armature-cores, as shown in my Patent No. 184,377.

In magneto-electric machines where one core is near another the magnetism of one core often acts in opposition to the magnetism of the next core and lessens the same, or tends to counteract or lessen the current or the secondary current flowing through the helices.

The object of this invention is to obtain great compactness and energy in the magnets and to cause one magnet to aid the next, and the inductive effect on one part of the helix to promote the current set up in all the circuit or metallic extensions from that helix.

In the drawings, Figure 1 is a side view of the machine. Fig. 2 is a cross-section of the same. Fig. 3 is a diagram illustrating the manner in which the helices are wound in the field-of-force magnets. Fig. 4 illustrates the manner of winding the armature-helices and the connections to the commutator-plates. Fig. 5 is an end view, illustrating the improvement as applied to a machine in which the number of magnets has been increased. Fig. 6 is a transverse section of a modification in the machine. Fig. 7 shows the commutators therefor, and Fig. 8 is a diagram illustrative of the connections in the machine.

The field-of-force magnets are composed of the cores $a$ $a$ upon the base-bars $b$ $b$. There may be two ranges of these, as shown in Figs. 1 and 2, or there may be four or more ranges, as shown in Figs. 5 and 6.

Each core is a flat bar, considerably wider than it is thick, and the edges are rounded to facilitate the winding of the helices. This form of core allows them to be placed side by side and close together, so that there will only be the room necessary for the helices. The cores can be wound and then screwed upon the base-bars $b$, or the helices can be wound upon the cores, whether separate or made in one with the respective base-bars.

The helices are wound so that the current between two cores goes in one direction and between the next two cores in the other direction. Hence one core will be north, the other south, and the action and reaction will tend to intensify the magnetic effect, and there will be no tendency for one current to lessen or neutralize another. This mode of winding is illustrated in Fig. 3, where the arrows denote the direction of the current in the helices. Although the helices are continuous or connected throughout any range of field-of-force magnets, still the currents between S N pass in one direction and between N S in the other direction, and this is the case regardless of the number of coils in each helix that may be made before passing to the next helix or connecting with the next helix; hence the field-of-force magnets become very powerful, and one helix can be pressed tightly against the next without any injurious inductive effect, and the helices and cores can be packed together flatwise to whatever extent is necessary for the required capacity of the machine.

The ends of the cores are arcs of circles, as shown at $r$; but they are not arcs from the center of the revolving shaft $c$, but they are arcs of a larger circle than that described by the revolving armature-cores. The object of this is to obtain a continuous current free from pulsations. The angles of the cores of the field-of-force magnets are farther from the path of the armature-cores than they are in the central portions of the cores; hence the induced current will not be suddenly pulsated, but there will be a gradual rise and fall of current in the armature-helix as it enters and leaves the magnetic field.

The armature-cores and armature-helices are made in the same manner as the field-of-force magnets. Each armature-core $e$ is narrow in the direction of the length of the shaft $c$ and broad in the direction of revolution. The positions of the armature-cores correspond to the cores of the field-of-force magnets in planes at right angles to the axis of revolution; but the ranges of armature-cores are preferably inclined so that the core at one end of a range of armatures reaches the culminating point in relation to the field-of-force magnets at about the same time as the armature-core at the other end of the next range of armature-cores. This effectually prevents pulsations in the current; but it is to be understood that in magneto-electric machines, when pulsations are desired, the ranges of armature-cores will be parallel to the axis of rotation, and that my mode of arranging the cores and helices side by side, flatwise, is available in such machines.

The helices of the armature-cores are wound in a similar manner to the helices of the field-of-force magnets, so that the induced current set up in the helices will not be lessened by counter-induction, and the polarity of the cores will be promoted by reaction with the adjoining cores; hence the greatest inductive effect will be obtained in the helices.

All the helices are in metallic connection one with the other. The direction of the winding of the wires is indicated in Fig. 4, and the end helix on one range is connected, by the wire 6, to the first helix on the next range.

I also make a metallic connection from one commutator-plate $h$ to the wire that passes from one helix to the next, and by preference I employ as many commutator-plates $h$ as there are helices, and I take off the current by the springs or brushes $k\ l$ at the place to which the positive and negative currents flow, respectively, and such currents will be continuous, the spring resting upon one commutator-plate before leaving the next.

Where there are four ranges of field-of-force magnets, as in Fig. 5, there should be four commutator-springs. These can be connected in pairs, or one current led through the field-of-force magnets and the other taken to an electric light or other apparatus and brought back to the negative; or all the current may pass through the field-magnets before or after being otherwise used.

Figs. 6, 7, and 8 illustrate the aforesaid improvement with eight stationary ranges and four revolving ranges, and the diagram Fig. 8 illustrates the circuit-connections when the revolving magnets are employed as the field-of-force magnets and the induced current is taken from the stationary ranges of magnets. In this instance the alternate currents set up in the circular range of stationary armature-magnets $e'$ will be changed into currents, in one direction, by passing through the commutator-springs $k\ l$ and plates $h$ to the helices of the revolving field-of-force magnets $a'$, and from those helices the current may pass to any electric appliance and back to the frame of the machine, and thence to the armature-helices $e'$; or a portion of the armature-helices and commutators may be used with the revolving field-of-force magnets, and another portion with electric lights or other appliances.

I have shown the pairs of helices of the armature-cores $e'$ connected at one end with the frame $b'$, the other ends by wires to commutator-springs $k\ l$. The four insulated commutator-plates $h$ are connected, alternately, to the insulated half-rings $w\ v$, the brushes of which connect by wires 10 with shaft $c$, and by wire 11 with brush and insulated ring $x$. The helices of the field-of-force magnets $a'$ are connected at one end to the shaft $c$ and at the other end to the insulated ring $x$, so that the current passing from the plates $v$ by 11, through $x$ and helices of $a$, returns, through shaft $c$ and frame $b'$, to the helices $e'$, or else through the wire 10, plates $w$ and $h$, to the helices $e'$, in which the opposite current is set up. These connections may include in any part electric lights or other electric appliances; or the currents may be led in any usual or desired direction, as well known in magneto-electric machines.

I do not claim, in a dynamo-electric machine, the pole-faces of the field-of-force magnets described on arcs of circles greater than the circles described by rotating their armature, and whose radii spring from centers removed from the centers of the axis of the armatures.

I claim as my invention—

1. In a magneto-electric machine, the flat cores wound with helices, in the manner specified, and set together flatwise, substantially as and for the purposes set forth.

2. In a magneto-electric machine, the stationary cores placed radially around the revolving cores, such cores being flat and longer in the direction of the revolution than in the direction of the axis, and the ends of the stationary cores arcs of circles of greater diameter than the circle described by the revolving cores, for the purposes set forth.

Signed by me this 6th day of May, A. D. 1879.

OTTO HEIKEL.

Witnesses:
GEO. T. PINCKNEY,
WILLIAM G. MOTT.